US006781667B2

(12) United States Patent
Horiguchi et al.

(10) Patent No.: US 6,781,667 B2
(45) Date of Patent: Aug. 24, 2004

(54) METHOD OF MANUFACTURING IMAGE-FORMING APPARATUS

(75) Inventors: Takahiro Horiguchi, Tokyo (JP); Hironobu Mizuno, Kanagawa (JP); Takashi Iwaki, Tokyo (JP); Masaaki Shibata, Kanagawa (JP); Kazuya Miyazaki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 151 days.

(21) Appl. No.: 10/078,456

(22) Filed: Feb. 21, 2002

(65) Prior Publication Data

US 2002/0117670 A1 Aug. 29, 2002

(30) Foreign Application Priority Data

Feb. 27, 2001 (JP) ....................................... 2001-051372
Feb. 18, 2002 (JP) ....................................... 2002-039518

(51) Int. Cl.$^{7}$ ............................. G02F 1/13; H01J 1/30; H01J 9/02

(52) U.S. Cl. ......................... 349/187; 313/495; 438/20; 445/24

(58) Field of Search ................................ 445/6, 24, 51; 349/187; 313/495; 438/20

(56) References Cited

U.S. PATENT DOCUMENTS

| | | | | |
|---|---|---|---|---|
| 5,876,260 A | | 3/1999 | Pepi et al. | 445/25 |
| 6,123,876 A | | 9/2000 | Kobayashi et al. | 252/519.2 |
| 6,179,678 B1 | | 1/2001 | Kishi et al. | 445/24 |
| 6,184,610 B1 | | 2/2001 | Shibata et al. | 313/309 |
| 6,221,426 B1 | | 4/2001 | Yamanobe | 427/77 |
| 6,246,168 B1 | | 6/2001 | Kishi et al. | 313/495 |
| 6,270,389 B1 | | 8/2001 | Kobayashi et al. | 445/24 |
| 6,334,803 B1 | | 1/2002 | Shibata | 445/51 |
| 6,366,015 B1 | | 4/2002 | Shibata | 313/495 |
| 6,383,047 B1 | | 5/2002 | Minami et al. | 445/6 |
| 6,554,946 B1 | * | 4/2003 | Yamanobe | 156/285 |
| 2002/0081931 A1 | * | 6/2002 | Iwaki et al. | 445/6 |
| 2003/0039767 A1 | | 2/2003 | Mizuno et al. | 427/595 |
| 2003/0073371 A1 | | 4/2003 | Iwaki | 445/24 |
| 2003/0160180 A1 | | 8/2003 | Arai et al. | 250/424 |
| 2003/0161942 A1 | | 8/2003 | Arai et al. | 427/77 |
| 2003/0162464 A1 | | 8/2003 | Kyogaku et al. | 445/24 |
| 2003/0162465 A1 | | 8/2003 | Mizuno et al. | 445/24 |
| 2003/0162467 A1 | | 8/2003 | Shimazu et al. | 445/50 |

FOREIGN PATENT DOCUMENTS

| | | |
|---|---|---|
| EP | 0 736 890 A1 | 10/1996 |
| EP | 0 788 130 A2 | 3/1997 |

(List continued on next page.)

OTHER PUBLICATIONS

Baba et al., "Field Emission from an Ion–Beam–Modified Polyimide Film," Jpn. J. Appl. Phys., V. pp. L261–L263 (1999).

*Primary Examiner*—Tarifur R. Chowdhury
(74) *Attorney, Agent, or Firm*—Fitzpatrick, Cella, Harper & Scinto

(57) ABSTRACT

This invention provides an image-forming apparatus manufacturing method capable of simplifying the electron-emitting device forming process and manufacturing a low-cost image-forming apparatus exhibiting high display quality for a long term. A plurality of electrode pairs each formed from electrodes are formed on a first substrate. Polymer films for connecting the electrodes are arranged. Then, the polymer films are irradiated with a laser beam or particle beam to reduce the resistances at least partially and change the polymer films into conductive films containing carbon as a main component. A current is flowed between the electrodes to form gaps in parts of the conductive films. The first substrate, and the second substrate on which an image-forming member is arranged are joined via bonding in a reduced-pressure atmosphere, constituting an image-forming apparatus.

10 Claims, 14 Drawing Sheets

FOREIGN PATENT DOCUMENTS

| | | | | |
|---|---|---|---|---|
| EP | 0 803 890 A1 | 10/1997 | | |
| EP | 0 986 085 A2 | 3/2000 | | |
| EP | 1 184 886 A1 | 3/2002 | ............. | H01J/9/02 |
| JP | 07-065704 | 3/1995 | | |
| JP | 8-22785 | 1/1996 | | |
| JP | 08-055563 | 2/1996 | | |
| JP | 8-321254 | 12/1996 | | |
| JP | 09-161666 | 6/1997 | | |
| JP | 9-237571 | 9/1997 | | |
| JP | 11-120901 | 4/1999 | ............. | H01J/9/02 |
| JP | 2000-299053 | 10/2000 | | |
| KR | 2000-0022939 | 4/2000 | | |
| KR | 2000-0058133 | 9/2000 | | |

* cited by examiner

METHOD OF MANUFACTURING IMAGE-FORMING APPARATUS

BACKGROUND OF THE INVENTION

1. Field of the Invention

The present invention relates to a method of manufacturing an image-forming apparatus such as a display apparatus constituted using an electron source obtained by arranging many electron-emitting devices.

2. Related Background Art

A surface conduction electron-emitting device has conventionally been known as an electron-emitting device.

The structure and manufacturing method of the surface conduction electron-emitting device are disclosed in, e.g., Japanese Laid-Open Patent Application No. 8-321254.

FIGS. 13A and 13B schematically show the structure of a general surface conduction electron-emitting device disclosed in this reference or the like. FIGS. 13A and 13B are a plan view and sectional view, respectively, showing the electron-emitting device disclosed in this reference or the like.

In FIGS. 13A and 13B, the electron-emitting device is constituted by a base or substrate 1, a pair of facing electrodes 2 and 3, conductive films 4, a second gap 5, carbon films 6, and a first gap 7.

FIGS. 14A to 14D schematically show an example of the forming process of the electron-emitting device having the structure shown in FIGS. 13A and 13B.

A pair of electrodes 2 and 3 are formed on the substrate 1 (FIG. 14A).

A conductive film 4 for connecting the electrodes 2 and 3 is formed (FIG. 14B).

The "forming step" of flowing a current between the electrodes 2 and 3 and forming a second gap 5 in part of the conductive film 4 is performed (FIG. 14C).

The "activation step" of applying a voltage between the electrodes 2 and 3 in a carbon compound atmosphere and forming carbon films 6 on the substrate 1 in the second gap 5 and on the neighboring conductive films 4 is performed to form an electron-emitting device (FIG. 14D).

Japanese Laid-Open Patent Application No. 9-237571 discloses another method of manufacturing a surface conduction electron-emitting device.

An image-forming apparatus such as a flat display panel can be implemented by a combination of an electron source made up of a plurality of electron-emitting devices formed by the above manufacturing method and an image-forming member comprised of a phosphor and the like.

SUMMARY OF THE INVENTION

The conventional device described above undergoes the "activation step" in addition to the "forming step". The carbon films 6 made of carbon or a carbon compound with the narrower first gap 7 are formed in the second gap 5 formed by the "forming step". This provides good electron-emitting characteristics.

The manufacture of an image-forming apparatus using a conventional electron-emitting device suffers the following problems.

This method has many additional steps such as repetitive energization steps in the "forming step" and "activation step", and the step of forming a suitable atmosphere in each step. Management of these steps is complicated.

To use the electron-emitting device for an image-forming apparatus such as a display, the electron-emitting characteristics are desirably improved more in order to reduce power consumption of the apparatus.

Further, it is desirable to more easily manufacture the image-forming apparatus using the electron-emitting device at lower cost.

The present invention has been made to overcome the conventional drawbacks, and has as its object to provide an image-forming apparatus manufacturing method capable of simplifying particularly the electron-emitting device manufacturing process and also improving electron-emitting characteristics.

The present invention has been made by extensive studies in order to solve the above-mentioned problems, and provides the following arrangement.

More specifically, the present invention provides a method of manufacturing an image-forming apparatus, comprising the steps of

- preparing a first substrate,
- forming a plurality of electrode pairs on the first substrate, each electrode pair comprising opposing electrodes,
- arranging polymer films, each polymer film bridging between the opposing electrodes in each electrode pair,
- irradiating each of polymer films with light or a particle beam to reduce a resistance of each polymer film and change at least part of each polymer film into a conductive film,
- flowing a current between the opposing electrodes in each to form a gap in the conductive film, and
- joining, in a reduced-pressure atmosphere, the first substrate on which the electron-emitting devices are arranged and a second substrate on which an image-forming member is arranged, via a bonding member.

As preferable forms, the image-forming apparatus manufacturing method of the present invention includes

- "the conductive film contains carbon as a primary component",
- "the particle beam includes an electron beam or an ion beam",
- "the electron beam has an acceleration voltage of 0.5 kV (inclusive) to 10 kV (inclusive)",
- "the electron beam has a current density of 0.01 mA/mm$^2$ (inclusive) to 1 mA/mm$^2$ (inclusive)",
- "the light includes a laser beam",
- "the light includes xenon light or halogen light",
- "the method further comprises, before the joining step, the step of applying a getter to a surface of the second substrate in a reduced-pressure atmosphere",
- "the step of arranging polymer films is performed using an ink-jet method", and
- "the polymer film is formed from a material selected from the group consisting of aromatic polyimide, polyphenylene oxadiazole, and polyphenylene vinylene."

The present invention can greatly simplify the process, compared to a conventional image-forming apparatus manufacturing method which requires the step of forming conductive films, the forming step, the step of forming an organic compound-containing atmosphere (or forming polymer films on the conductive films), and the step of applying power to form gaps of carbon or a carbon compound. The electron-emitting device itself attains high heat resistance. Thus, electron-emitting characteristics, which are restricted by the performance of the conductive film, can also be improved.

DETAILED DESCRIPTION OF THE PREFERRED EMBODIMENTS

Preferred embodiments of the present invention will be described below, but the present invention is not limited to these embodiments.

Figure 16:
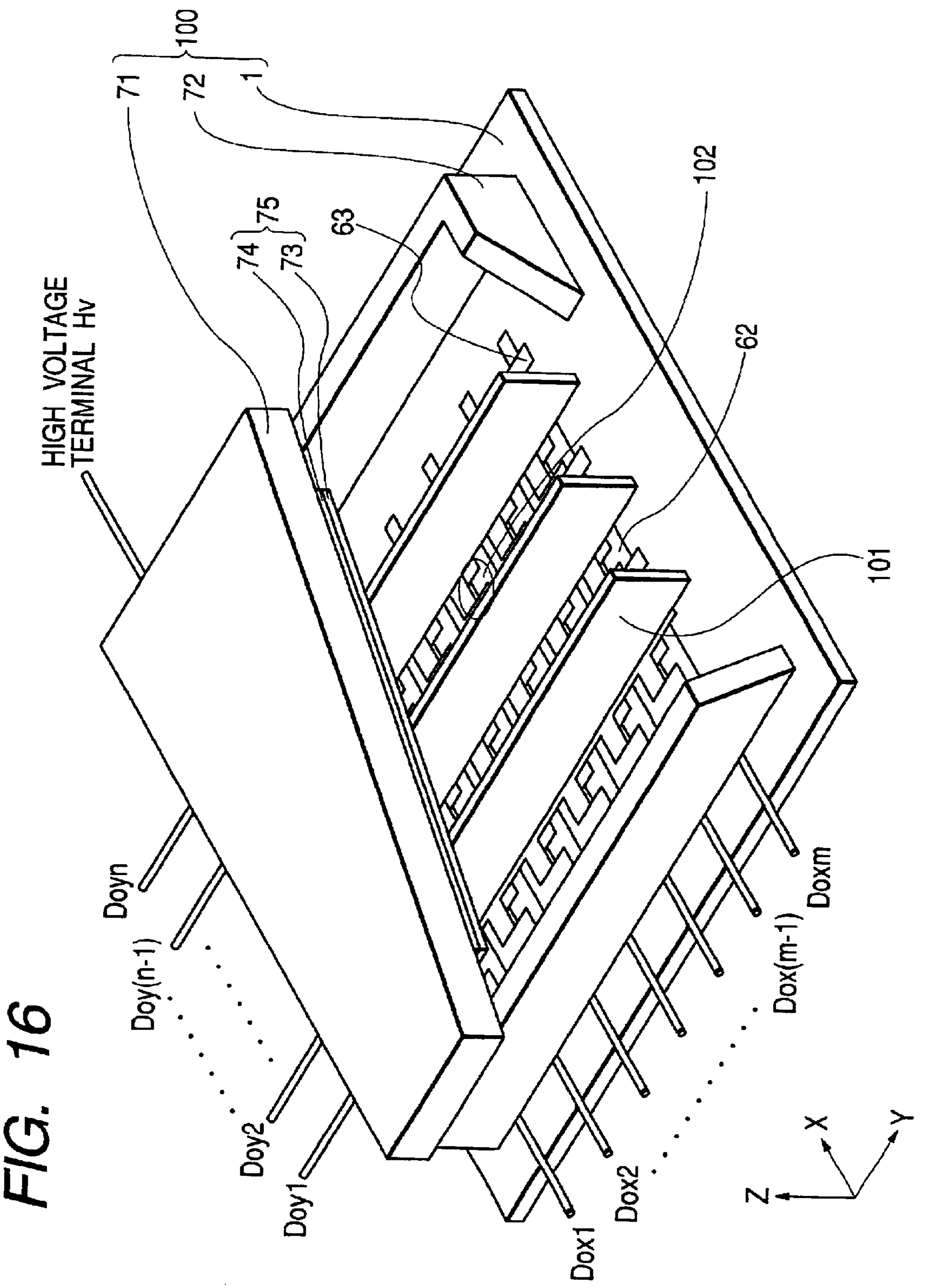
FIG. 16 is a schematic perspective view showing an image-forming apparatus according to the present invention.

FIG. 16 is a schematic view showing an example of an image-forming apparatus manufactured by a manufacturing method according to the present invention. FIG. 16 is a view in which part of a support frame 72 and face plate 71 (both of which will be described later) is removed to explain the internal structure of the image-forming apparatus (airtight vessel 100).

In FIG. 16, many electron-emitting devices 102 are arranged on a rear plate 1. An image-forming member 75 is formed on the face plate 71. The support frame 72 holds a reduced-pressure state between the face plate 71 and the rear plate 1. Spacers 101 are arranged to hold the interval between the face plate 71 and the rear plate 1.

When the image-forming apparatus 100 is a display, the image-forming member 75 is made up of a phosphor film 74 and conductive film (metal back) 73. Wiring lines 62 and 63 are connected to apply a voltage to the electron-emitting devices 102. Extraction wiring lines Doy1 to Doyn and Dox1 to Doxm connect, e.g., a driving circuit arranged outside the image-forming apparatus 100 to the ends of the wiring lines 62 and 63 extracted outside from the reduced-pressure space (space defined by the face plate, rear plate, and support frame) of the image-forming apparatus.

Figure 1A:
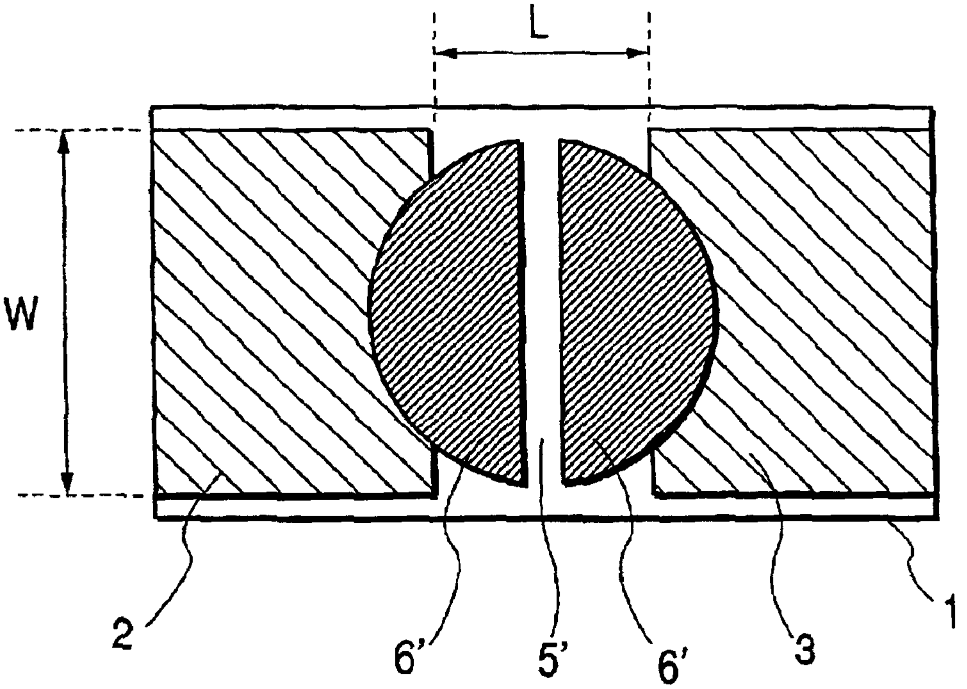
FIGS. 1A and 1B are a schematic plan view and sectional view, respectively, showing an electron-emitting device according to the present invention.
Figure 1B:
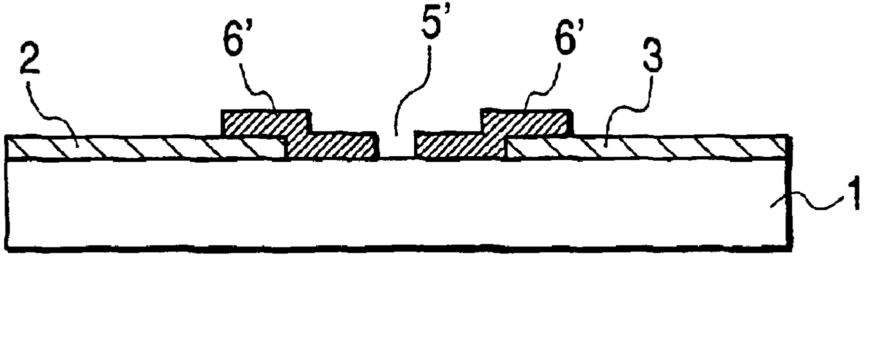

FIGS. 1A and 1B schematically show the electron-emitting device 102. FIG. 1A is a plan view, and FIG. 1B is a sectional view.

In FIGS. 1A and 1B, the electron-emitting device 102 is constituted by the base (rear plate) 1, electrodes 2 and 3, conductive films 6' mainly consisting of carbon, and a gap 5'. The conductive films 61 are formed on the base 1 between the electrodes 2 and 3. The conductive films 6' cover part of the electrodes 2 and 3 to realize reliable connection with the electrodes.

FIGS. 1A and 1B schematically show the conductive films 6' which face each other in a direction substantially parallel to the surface of the substrate 1 and are completely separated at the boundary of the gap 5'. The conductive films 6' can be partially coupled. That is, a gap can be formed in part of a conductive film which mainly consists of carbon and electrically connects a pair of electrodes. Alternatively, the conductive film 6' can be a conductive film mainly consisting of carbon with the gap 5'. Alternatively, the conductive film 6' can be a pair of conductive films mainly consisting of carbon.

In the electron-emitting device having the above structure, electrons tunnel through the gap 5' upon application of a sufficient electric field, flowing a current between the electrodes 2 and 3. Some of tunnel electrons act as emitted electrons by scattering.

Considering the stability of electron-emitting characteristics, the entire conductive film 6' is most preferably conductive. However, at least part of the conductive film 6' suffices to be conductive. This is because, if the conductive film 6' is an insulator, no electric field is applied to the gap 5' even upon application of a potential difference between the electrodes 2 and 3, failing to emit electrons. The conductive film 6' is preferably conductive at least in a region between the electrode (electrodes 2 and 3) and the gap 5'. This structure allows applying a satisfactory electric field to the gap 5'.

FIGS. 2A to 2D are schematic views showing an example of a method of manufacturing the above electron-emitting device. The example of the electron-emitting device manufacturing method will be explained with reference to FIGS. 1A, 1B, and 2A to 2D.

Figure 2A:
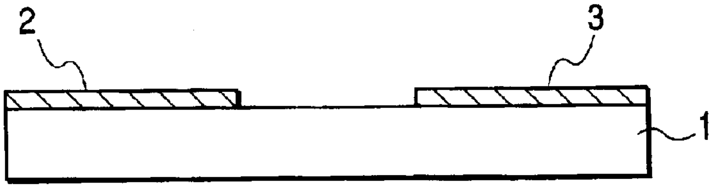
FIGS. 2A, 2B, 2C and 2D are schematic sectional views showing an example of the fabrication method of the electron-emitting device according to the present invention.

(1) A substrate (base) 1 made of glass or the like is completely cleaned with a detergent, pure water, organic solvent, and the like. An electrode material is deposited by vacuum evaporation, sputtering, or the like. Then, electrodes 2 and 3 are formed on the base 1 by, e.g., photolithography (FIG. 2A). The electrode material can be an oxide conductor as a transparent conductor such as a tin oxide film or indium tin oxide (ITO) film in accordance with a need, for example, a case wherein the laser irradiation process is to be performed (to be described later).

Figure 2B:
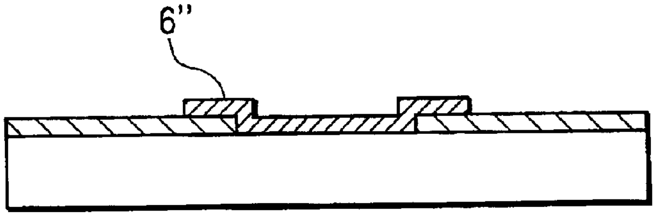

(2) A polymer film 6" for connecting the electrodes 2 and 3 is formed on the base 1 having the electrodes 2 and 3 (FIG. 2B). The polymer film 6" is preferably made of polyimide.

The polymer film 6" can be formed by various known methods such as spin coating method, printing, and dipping. Especially, the printing method is preferable because it can form the shape of a desired polymer film 6" without using any patterning means. Of printing methods, an ink-jet printing method enables directly forming a pattern several hundred μm or less. This method is also effective for the manufacture of an electron source which has electron-emitting devices arranged at high density and is to be applied to a flat display panel.

To form the polymer film 6", the solvent of a polymer material (liquid containing a polymer material) is applied to a desired region and dried. If necessary, the precursor solution of a polymer material (liquid containing the precursor of a polymer material) may be applied to a desired region and polymerized by heating or the like.

If the polymer film 6" is formed by the ink-jet method, the solution of a polymer material is applied as droplets from the orifices of an ink-jet apparatus to a desired region and dried. If necessary, a desired polymer precursor solution can be applied as droplets from the orifices of the ink-jet apparatus to a desired region and polymerized by heating or the like.

The "polymer" in the present invention means one having at least bonds between carbon atoms. The molecular weight of the polymer in the present invention is 5,000 or more, and preferably 10,000 or more.

Heating a polymer having bonds between carbon atoms may cause dissociation and recombination of bonds between carbon atoms, increasing the conductivity. A polymer whose conductivity is increased as a result of heating is called a "pyrolytic polymer".

In the present invention, the pyrolytic polymer also includes a polymer whose conductivity is increased by dissociation and recombination of bonds between carbon atoms as a result of decomposition and recombination by an electron beam other than heat, and decomposition and recombination by a photon, in addition to decomposition and recombination by heat.

In the present invention, changes in polymer structure and changes in conductive characteristics by heat and another factor will be generally called "transforming".

The pyrolytic polymer can be construed to increase its conductivity because conjugated double bonds between carbon atoms in the polymer increase. The conductivity changes depending on the progress of transforming.

A polymer which easily develops conductivity by dissociation and recombination of bonds between carbon atoms, i.e., a polymer which easily generates double bonds between carbon atoms is an aromatic polymer.

For this reason, the polymer of the present invention is preferably an aromatic polymer. Of aromatic polymers, aromatic polyimide is a more preferable polymer material in the present invention because a pyrolytic polymer with high conductivity can be obtained at a relatively low temperature.

Aromatic polyimides are generally insulators, but include polymers such as polyphenylene oxadiazole and polyphenylene vinylene which exhibit conductivity before pyrolysis. These polymers can also be preferably adopted in the present invention because they further develop conductivity by pyrolysis. As a polymer, a photoresist can also be employed.

The present invention preferably uses aromatic polymers as the polymer material, but most of them are hardly dissolved in a solvent. Thus, a method of applying the precursor solution of such an aromatic polymer is effective. For example, a polyamic acid solution as an aromatic polyimide precursor can be applied (droplets can be applied) to form a polyimide film by heating or the like.

Examples of the solvent which dissolves a polymer precursor are N-methylpyrrolidone, N,N-dimethylacetamide, N,N-dimethylformamide, and dimethylsulfoxide. These materials can be used together with n-butyl Cellosolve, triethanolamine, or the like. The solvent material is not particularly limited to these solvents as far as the present invention can be applied.

(3) Then, the "resistance reduction processing" of reducing the resistance of the polymer film 6" is performed. The "resistance reduction processing" is processing of rendering the polymer film 6" conductive and changing it into the conductive film 6' (resistance-reduced polymer film 6"). In this step, resistance reduction processing continues until the sheet resistance of the polymer film 6" decreases to the range of $10^3$ Ω/□ or more to $10^7$ Ω/□ or less in terms of the gap forming step (to be described later). In terms of the resistance value between the electrodes 2 and 3, resistance reduction processing preferably continues until this resistance value decreases to the range of $10^{-3}$ Ω or more to 10Ω or less.

As an example of "resistance reduction processing", the polymer film 6" can be reduced in resistance by heating it. The reason the polymer film 6" is reduced in resistance (develops conductivity) by heating is that the polymer film 6" develops conductivity upon dissociation and recombination of bonds between carbon atoms in the polymer film 6".

"Resistance reduction processing" by heating can be achieved by heating polymers which form the polymer film 6" at their decomposition temperature or more. The polymer film 6" is preferably heated in an oxidization suppressing atmosphere such as an inert gas atmosphere or vacuum.

The above-mentioned aromatic polymer, particularly aromatic polyimide has a high pyrolysis temperature. The aromatic polymer can attain high conductivity by heating it at a temperature higher than its pyrolysis temperature, typically 700° C. to 800° C.

In terms of the heat resistance of another member which constitutes an electron-emitting device, some restrictions may be posed on a method of heating the entire polymer film 6" by an oven or hot plate in order to continue heating until the polymer film 6" as a member which constitutes the electron-emitting device is pyrolized. Particularly, the base 1 is limited to one having high heat resistance, such as a silica glass or ceramics substrate. Applying the present invention to a large-area display results in very high cost.

Figure 2C:
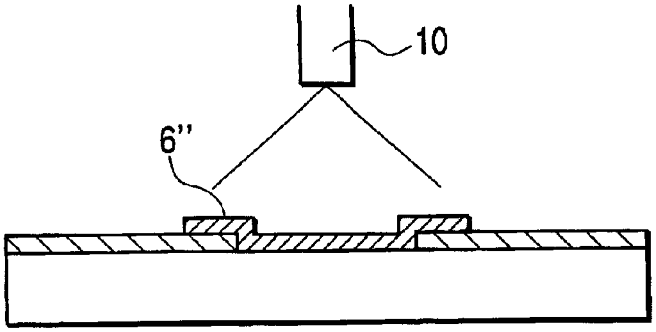

To prevent this, the present invention preferably reduces the resistance of the polymer film 6" by irradiating the polymer film 6" with a particle beam or light from a particle beam irradiation means 10 for an electron beam or ion beam or a light irradiation means 10 for halogen light or a laser beam, as shown in FIG. 2C. This enables reducing the resistance of the polymer film 6" without using any special substrate.

An example of "resistance reduction processing" will be described below.

Use of Irradiation of Particle Beam

To irradiate the polymer film 6" with an electron beam as an example of a particle beam, the base 1 on which the electrodes 2 and 3 and the polymer film 6" are formed is set in a reduced-pressure atmosphere (vacuum vessel) in which an electron gun is installed. The electron gun in the vessel emits an electron beam to the polymer film 6". The electron beam irradiation condition at this time is preferably an acceleration voltage $V_{ac}$ =0.5 kV or more to 10 kV or less. The current density ($I_d$) is preferably $I_d$ =0.01 mA/mm$^2$ or more to 1 mA/mm$^2$ or less. It is also preferable to monitor the resistance value between the electrodes 2 and 3 during irradiation of the electron beam, and to stop irradiation of the electron beam once a desired resistance value is obtained.

Use of Irradiation of Laser Beam

To irradiate the polymer film 6" with a laser beam, the base 1 on which the electrodes 2 and 3 and the polymer film 6" are formed is set on a stage. Then, the polymer film 6" is irradiated with a laser beam. The environment where the polymer film 6" is irradiated with a laser beam is preferably an inert gas atmosphere or vacuum in order to suppress oxidization (combustion) of the polymer film 6". However, irradiation may be done in air depending on the laser irradiation condition.

As the laser beam irradiation condition, irradiation preferably uses, e.g., the second harmonic (wavelength: 632 nm) of a pulse YAG laser. It is also preferable to monitor the resistance value between the electrodes 2 and 3 during laser irradiation, and to stop irradiation of the laser beam once a desired resistance value is obtained.

Substantially only the polymer film 6" is more preferably heated by selecting as the material of the polymer film 6" a material which is higher in light absorption with respect to an irradiation laser beam than the material of the electrodes 2 and 3.

(Use of Irradiation of Light Other Than Laser Beam)

To irradiate the polymer film 6" with light other than a laser beam, the base 1 on which the electrodes 2 and 3 and the polymer film 6" are formed is set on a stage. Then, the polymer film 6" is irradiated with light. The environment where the polymer film 6" is irradiated with light is preferably an inert gas atmosphere or vacuum in order to suppress oxidization (combustion) of the polymer film 6". However, irradiation may be done in air depending on the light irradiation condition.

Examples of the light source are a xenon lamp and halogen lamp. Light from the light source is condensed by a condenser means to irradiate the polymer film 6". This can reduce the resistance of the polymer film.

Light emitted by a xenon lamp contains almost successive light components from a visible light component to an infrared light component. This light has a plurality of steep peak intensities in a near infrared wavelength range around a wavelength of 1 λm. Light emitted by a halogen lamp mainly consists of visible light. The type of light source is preferably selected in accordance with the light absorption characteristic of the polymer film or electrode material.

Deformation or the like may occur by heating depending on the substrate material. To prevent this, light pulses can be emitted (intermittently emitted) to suppress excessive heating of the substrate. Pulse irradiation is also preferably adopted due to the same reasons as those of laser beam irradiation and particle beam irradiation.

Substantially only the polymer film 6" is more preferably heated by selecting as the material of the polymer film 6" a material which is higher in light absorption with respect to irradiation light than the material of the electrodes 2 and 3.

It is also preferable to monitor the resistance value between the electrodes 2 and 3 during irradiation of light, and to stop irradiation of light once a desired resistance value is obtained.

In light irradiation, many regions can be relatively easily irradiated with light at once by widening the condensing region. Hence, light irradiation can be preferably applied when many electron-emitting devices are arranged on a large-area substrate.

The polymer film 6" is preferably irradiated entirely with a particle beam or light, but need not always be irradiated entirely. Part of the polymer film 6" may be reduced in resistance, which also enables the following steps.

Considering that the electron-emitting device of the present invention is driven in vacuum, a low-conductivity region should not be exposed in vacuum. From this, “resistance reduction processing” is preferably conducted for substantially the entire polymer film 6".

The conductive film 6' formed by “resistance reduction processing” is called a “conductive film mainly consisting of carbon” or simply a “carbon film”.

In this manner, light irradiation or particle beam irradiation reduces the resistance of the polymer film 6".

In the above example, the substrate 1 is irradiated with light or a particle beam from the side on which the polymer film 6" is formed, as shown in FIG. 2C. According to the present invention, light irradiation can achieve “resistance reduction processing” by transmitting light through the substrate 1 from the lower surface (side on which the polymer film 6" is not formed) of the substrate 1, and irradiating the polymer film 6" with light. In this case, the substrate 1 is a transparent substrate such as a glass substrate.

Figure 2D:
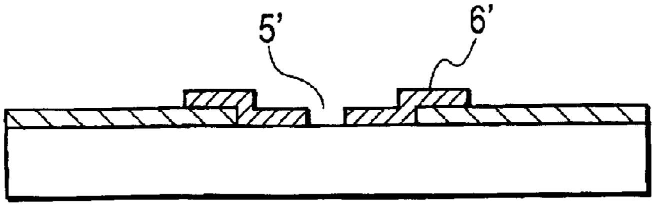

(4) The “voltage application step” for forming a gap 5' between the conductive films 6' obtained by the preceding step is performed (FIG. 2D).

The gap 5' is formed by applying a voltage (flowing a current) between the electrodes 2 and 3. The application voltage is preferably a pulse voltage. The “voltage application step” forms the gap 5' in part of the conductive film 6'.

The “voltage application step” can also be executed at the same time as the above-described “resistance reduction processing” by successively applying voltage pulses between the electrodes 2 and 3 during irradiation of a particle beam or light. In either case, the “voltage application step” is desirably done in a reduced-pressure atmosphere, and preferably an atmosphere at a pressure of $1.3\times10^{-3}$ Pa or less.

The “voltage application step” flows a current corresponding to the resistance value of the conductive film 6'. If the resistance of the conductive film 6' is extremely low, i.e., resistance reduction excessively progresses, formation of the gap 5' requires large power. To form the gap 5' by relatively small energy, the progress of resistance reduction is adjusted. Resistance reduction processing is most preferably performed uniformly over the entire region of the polymer film 6". Alternatively, only part of the polymer film 6" may undergo resistance reduction processing.

Figure 3A:
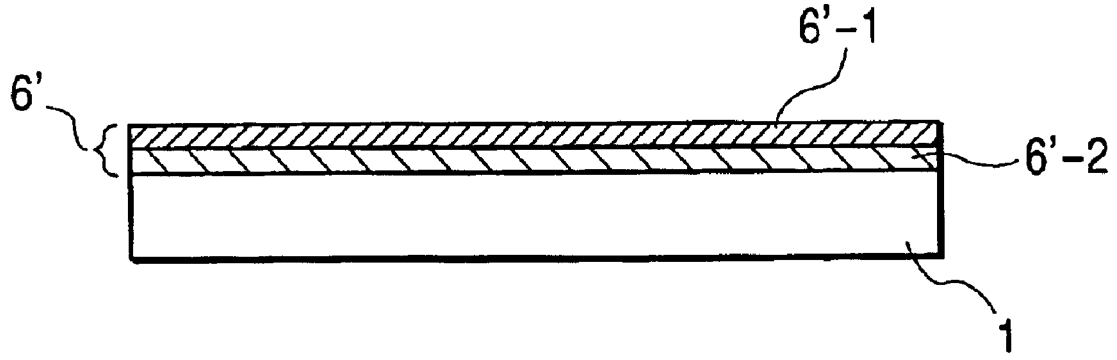
FIGS. 3A and 3B are schematic sectional views showing another example of the fabrication method of the electron-emitting device according to the present invention.
Figure 3B:
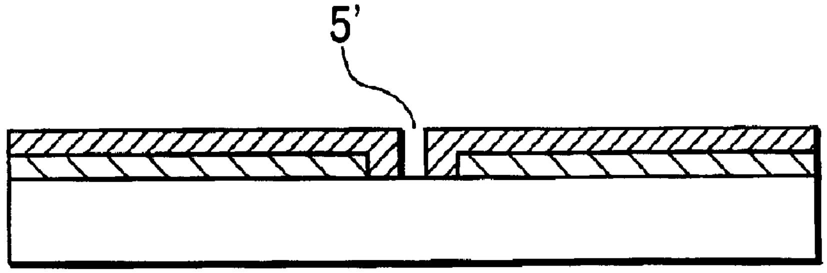

FIGS. 3A and 3B are schematic views (sectional views) showing the forming process of the gap 5' when “resistance reduction processing” partially reduces the resistance of the surface of the polymer film 6". FIG. 3A shows a state before the voltage application step (after “resistance reduction processing”). FIG. 3B shows a state at the end of the voltage application step.

In FIG. 3A, a region 6'-1 where the resistance is reduced by “resistance reduction processing” and a region 6'-2 where the resistance is not reduced are formed on the substrate. In FIG. 3B, the gap 5' is formed.

The voltage application step flows a current mainly through the surface region 6'-1 having undergone resistance reduction processing. As a result, the start point of the gap 5' is formed in part of the surface region 6'-1. The voltage application step continues to cause electrons to tunnel the formed start point of the gap 5'. Heat generated by tunneling gradually pyrolizes the lower polymer region 6'-2 which has not been pyrolized. The gap grows from the portion serving as the start point of the gap 5' toward the direction of thickness of the conductive film 6', forming the gap 5' (FIG. 3B).

Even if the resistance-reduced region 6'-1 is on the substrate 1 side or at the intermediate position in film thickness, the gap 5' can be finally formed in the direction of thickness of the conductive film 6'.

Figure 4A:
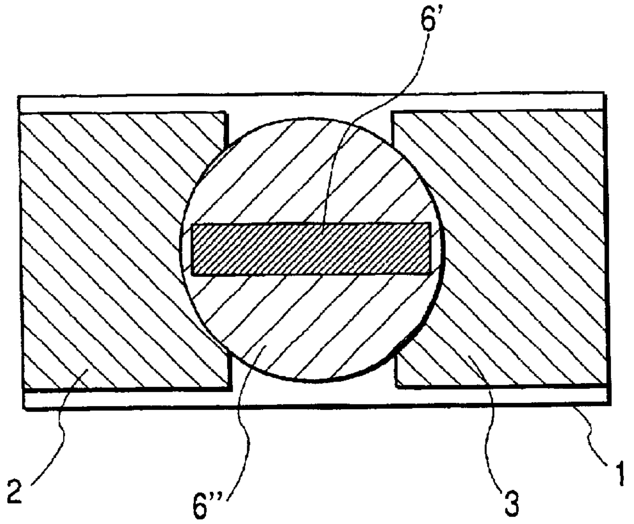
FIGS. 4A, 4B and 4C are schematic sectional views showing still another example of the fabrication method of the electron-emitting device according to the present invention.
Figure 4B:
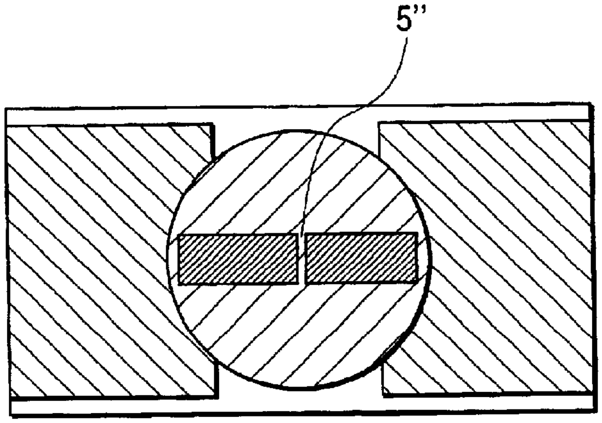
Figure 4C:
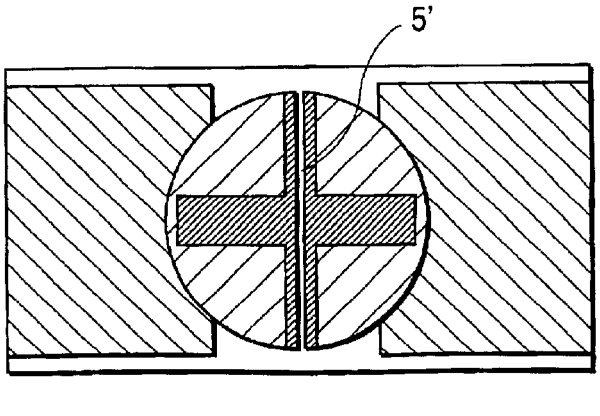

FIGS. 4A to 4C are schematic views (plan views) when part of the polymer film 6" is reduced in reduction in a direction parallel to the substrate surface. FIG. 4A shows a state before the voltage application step, FIG. 4B shows a state immediately after the start of the voltage application step, and FIG. 4C shows a state at the end of the voltage application step.

The voltage application step flows a current mainly through the resistance-reduced region 6' to form a narrow gap 5" as the start point of the gap 5' (FIG. 4B). While electrons tunnel the formed narrow gap 5", scatter, and emerge, a region which has not been pyrolized is gradually pyrolized. Finally, the gap 5' is formed in the entire polymer film 6" in a direction substantially parallel to the substrate surface (FIG. 4C).

In some cases, the conductive film 6' attained via the above-described "resistance reduction processing" further decreases in resistance in the "voltage application step". The conductive film 6' obtained by "resistance reduction processing" and the conductive film 6' after the gap 5' is formed via the "voltage application step" may slightly differ in electrical characteristics, film thickness, or the like. The present invention does not discriminate the carbon film (conductive film) 6' obtained by performing "resistance reduction processing" for the polymer film 6" from the carbon film (conductive film) 6' after the gap 5' is formed via the "voltage application step", unless otherwise specified.

Figure 5:
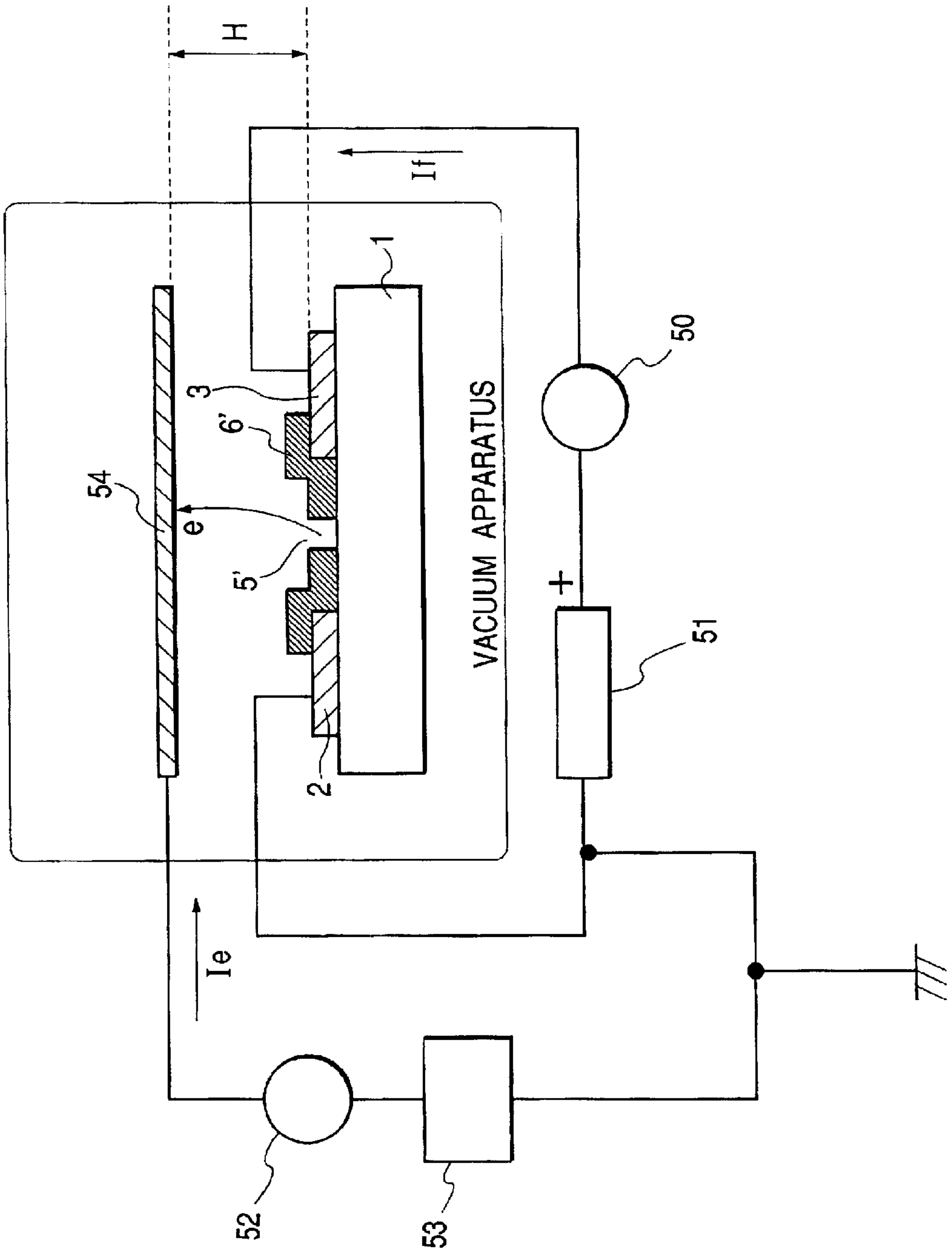
FIG. 5 is a schematic view showing an example of a vacuum apparatus having a measurement evaluating function.
Figure 15:
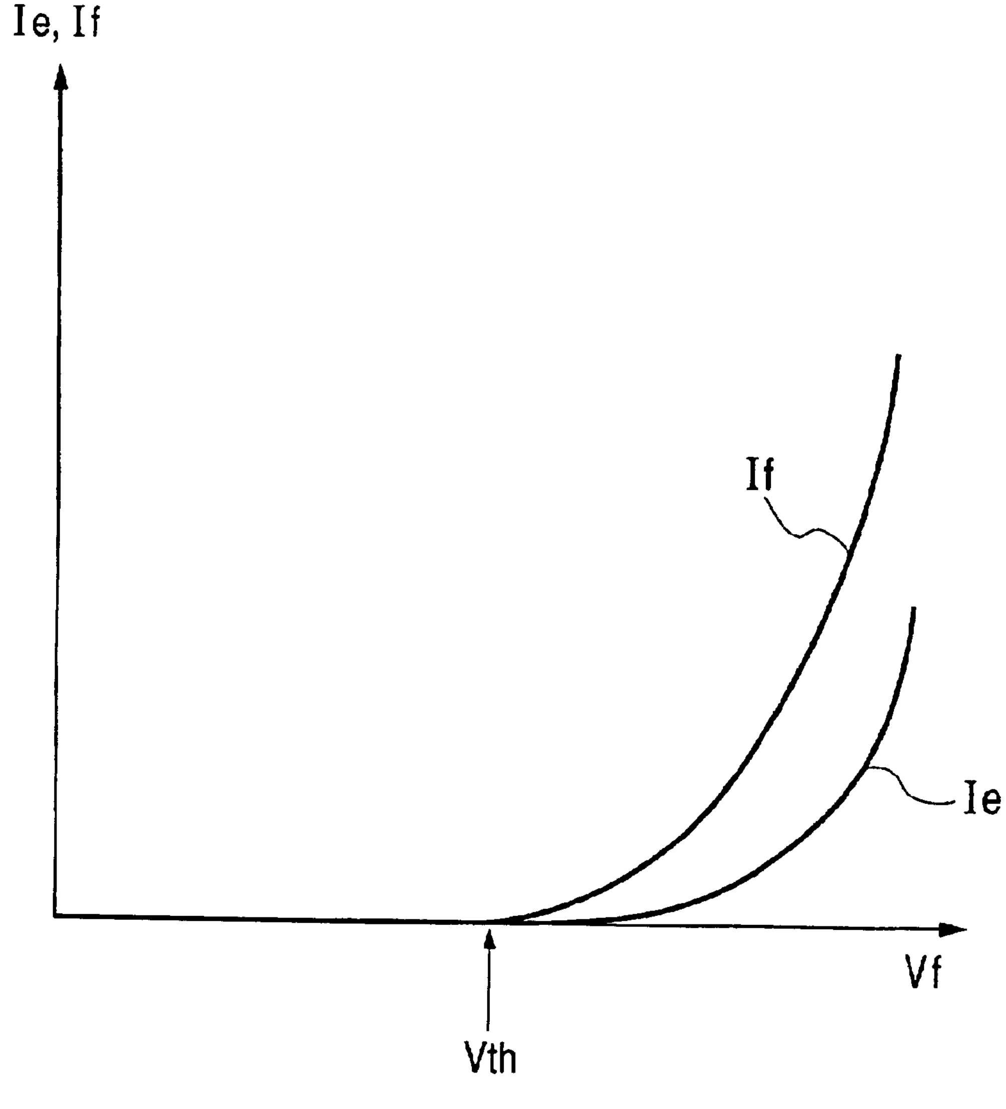
FIG. 15 is a graph showing the electron-emitting characteristics of the electron-emitting device according to the present invention.

The current-voltage characteristic of the electron-emitting device obtained via these steps is measured by a measurement apparatus shown in FIG. 5, finding a characteristic shown in FIG. 15. In FIG. 5, the same reference numerals as in FIG. 1 denote the same parts. The measurement apparatus comprises an anode 54, a high-voltage power supply 53, an ammeter 52 for measuring an emission current Ie emitted by the electron-emitting device, a power supply 51 for applying a driving voltage Vf to the electron-emitting device, and an ammeter 50 for measuring a device current flowing through a path between the electrodes 2 and 3. The electron-emitting device has a threshold voltage Vth. Even if a voltage lower than the threshold voltage is applied between the electrodes 2 and 3, no electron is substantially emitted. By applying a voltage higher than the threshold voltage, the device generates the emission current (Ie) and the device current (If) flowing through a path between the electrodes 2 and 3.

With this characteristic, an electron source in which a plurality of electron-emitting devices are arrayed in a matrix on a single substrate can realize simple matrix driving of selecting and driving a desired device.

An example of a method of manufacturing an image-forming apparatus shown in FIG. 16 using the electron-emitting device according to the present invention will be explained with reference to FIGS. 6 to 12. The manufacturing steps of the electron-emitting device are basically the same as the above-described steps (1) to (4).

(A) A rear plate 1 is prepared. The rear plate 1 is made of an insulating material, particularly glass.

Figure 6:
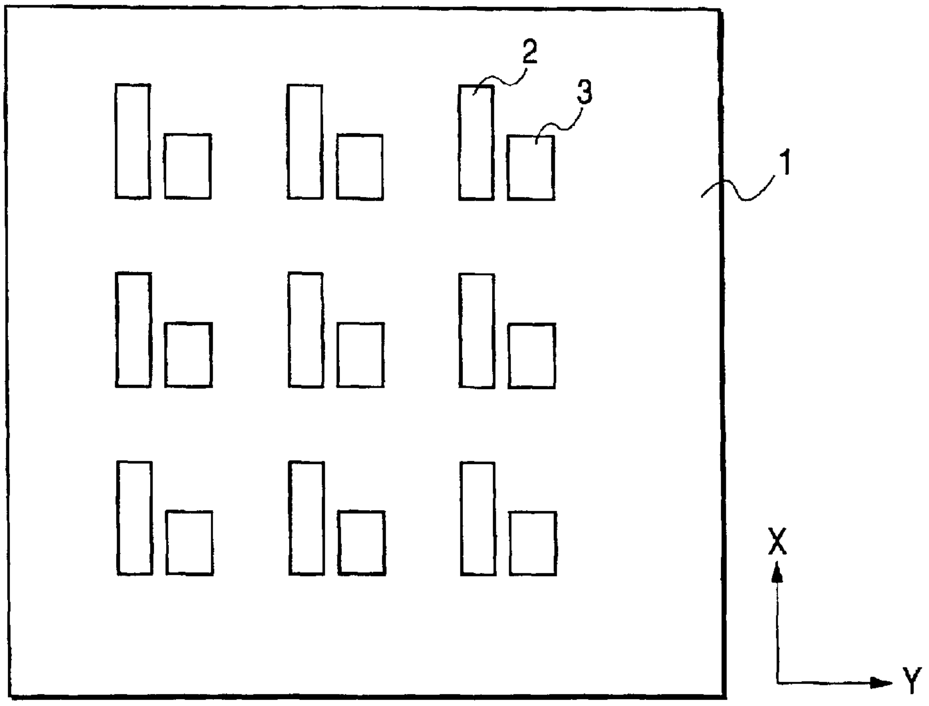
FIG. 6 is a schematic view showing an example of the manufacturing step of an electron source with a simple matrix layout according to the present invention.

(B) A plurality of pairs of electrodes 2 and 3 shown in FIG. 1 are formed on the rear plate 1 (FIG. 6). The electrode material suffices to be a conductive material. The electrodes 2 and 3 can be formed by various manufacturing methods such as sputtering, CVD, and printing. For descriptive convenience, FIG. 6 shows a total of nine pairs of electrodes, three pairs in the X direction and three pairs in the Y direction. The number of pairs of electrodes is properly set in accordance with the resolution of the image-forming apparatus.

Figure 7:
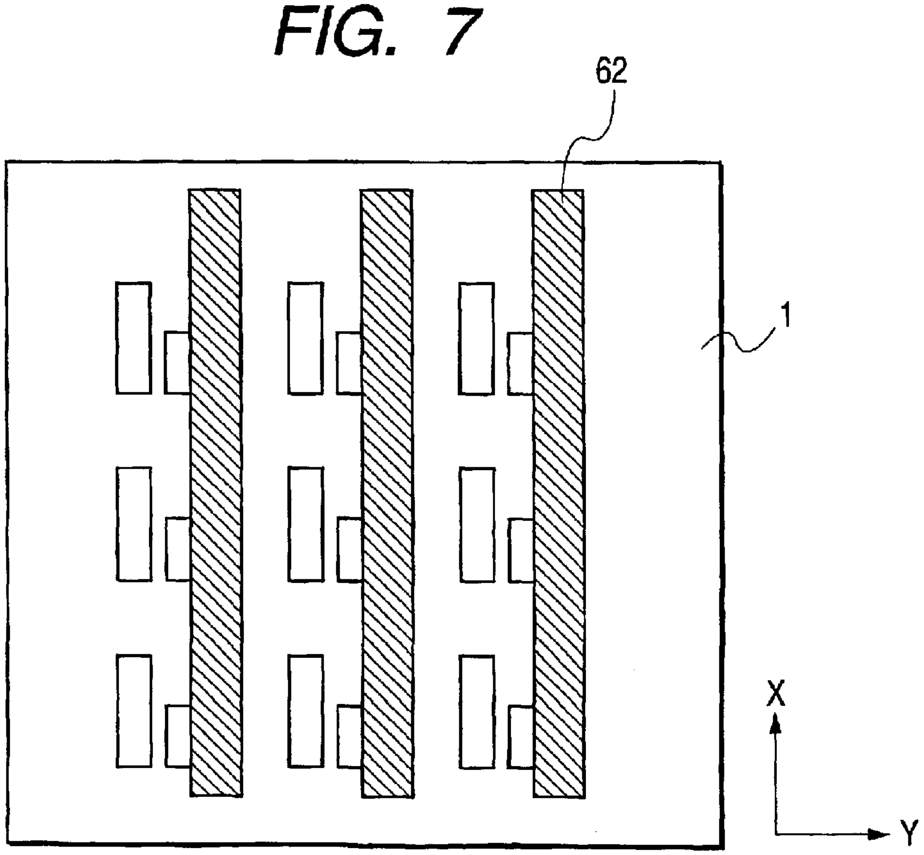
FIG. 7 is a schematic view showing the example of the manufacturing step of the electron source with the simple matrix layout according to the present invention.

(C) Lower wiring lines 62 are so formed as to cover part of each electrode 3 (FIG. 7). The lower wiring line 62 can be formed by various methods, preferably by printing. Of printing methods, screen printing can preferably form a large-area substrate at low cost.

Figure 8:
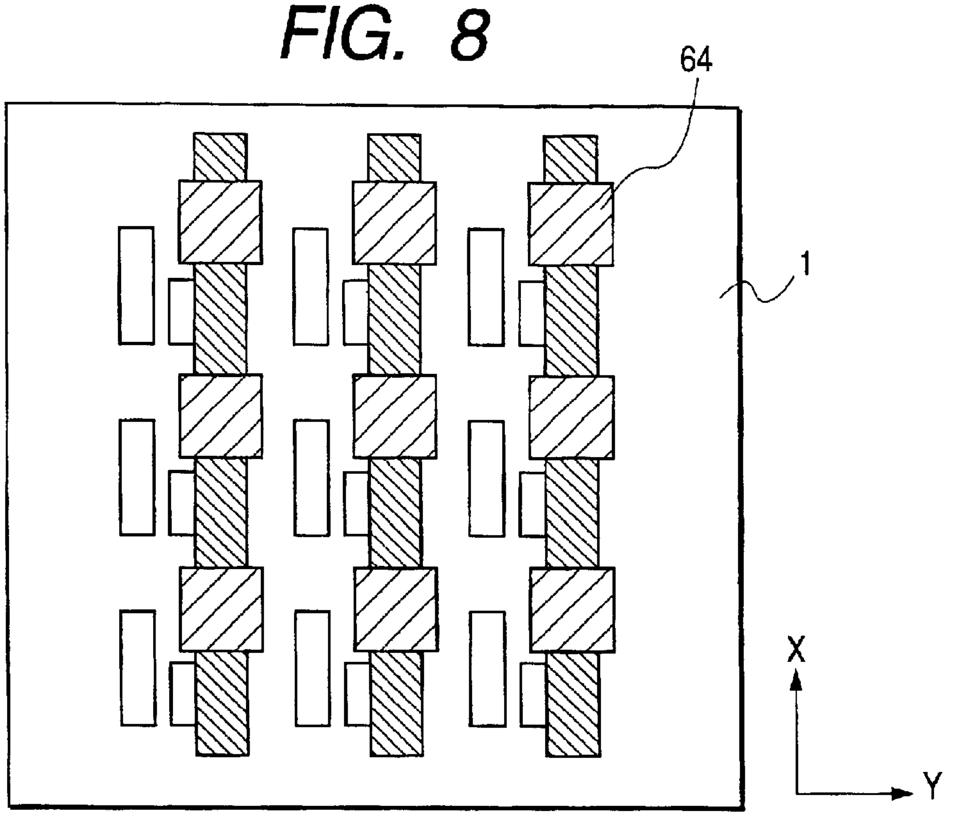
FIG. 8 is a schematic view showing the example of the manufacturing step of the electron source with the simple matrix layout according to the present invention.

(D) Insulating layers 64 are formed at the intersections between the lower wiring lines 62 and upper wiring lines 63 to be formed in the next step (FIG. 8). The insulating layer 64 can also be formed by various methods, preferably by printing. Of printing methods, screen printing can preferably form a large-area substrate at low cost.

Figure 9:
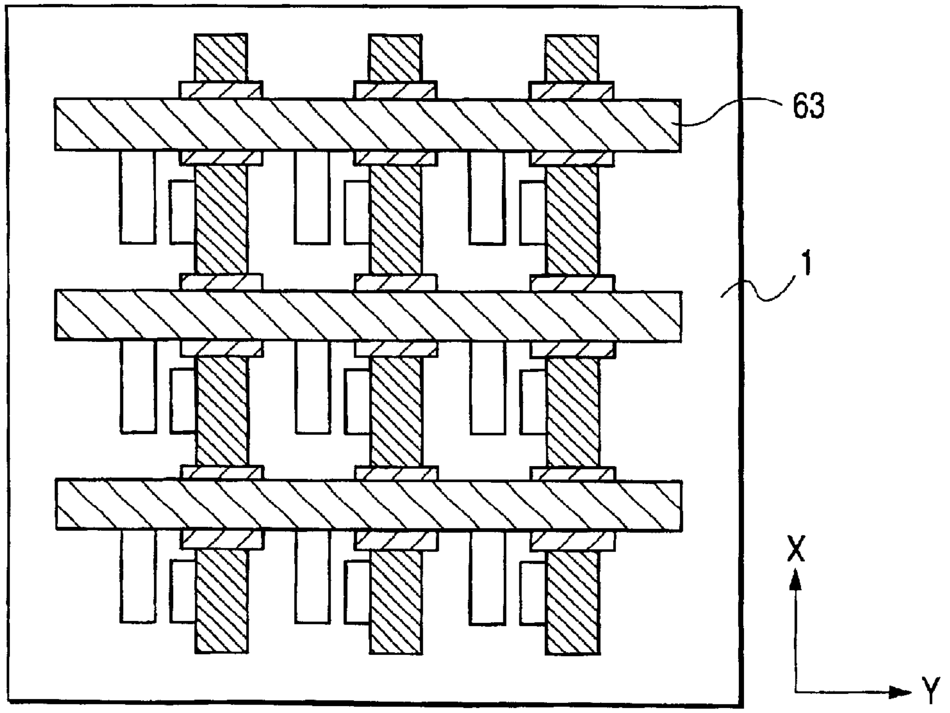
FIG. 9 is a schematic view showing the example of the manufacturing step of the electron source with the simple matrix layout according to the present invention.

(E) Upper wiring lines 63 substantially perpendicular to the lower wiring lines 62 are formed (FIG. 9). The upper wiring line 63 can also be formed by various methods, preferably by printing similar to the lower wiring line 62. Of printing methods, screen printing can preferably form a large-area substrate at low cost.

Figure 10:
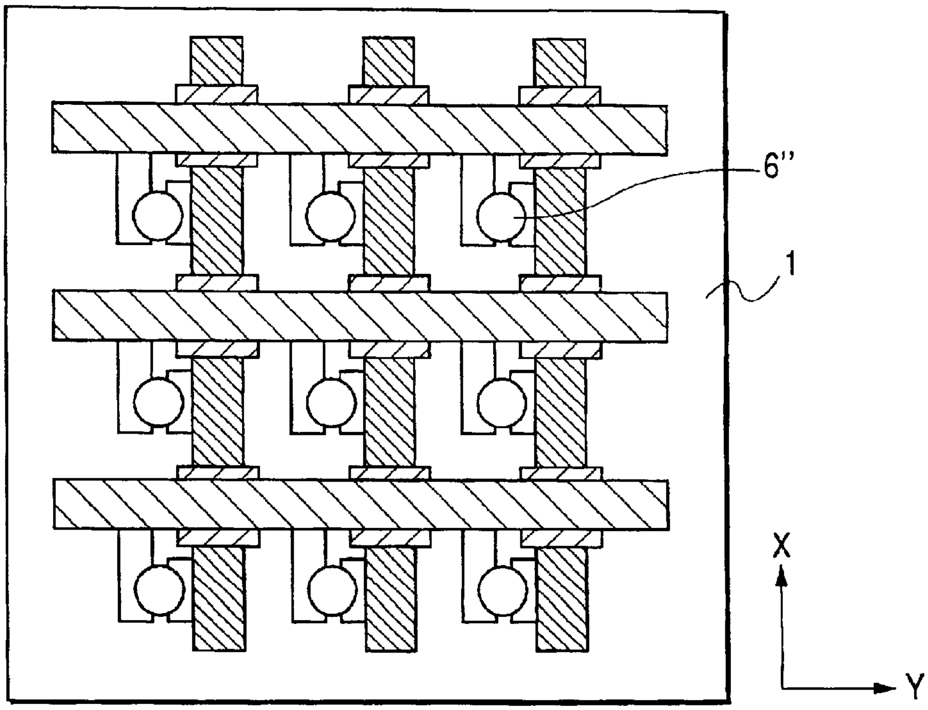
FIG. 10 is a schematic view showing the example of the manufacturing step of the electron source with the simple matrix layout according to the present invention.

(F) Each polymer film 6" is so formed as to connect a corresponding pair of electrodes 2 and 3 (FIG. 10). The polymer film 6" can be formed by various methods, as described above. To easily form the polymer films 6" in a large area, an ink-jet method is preferably employed.

Figure 11:
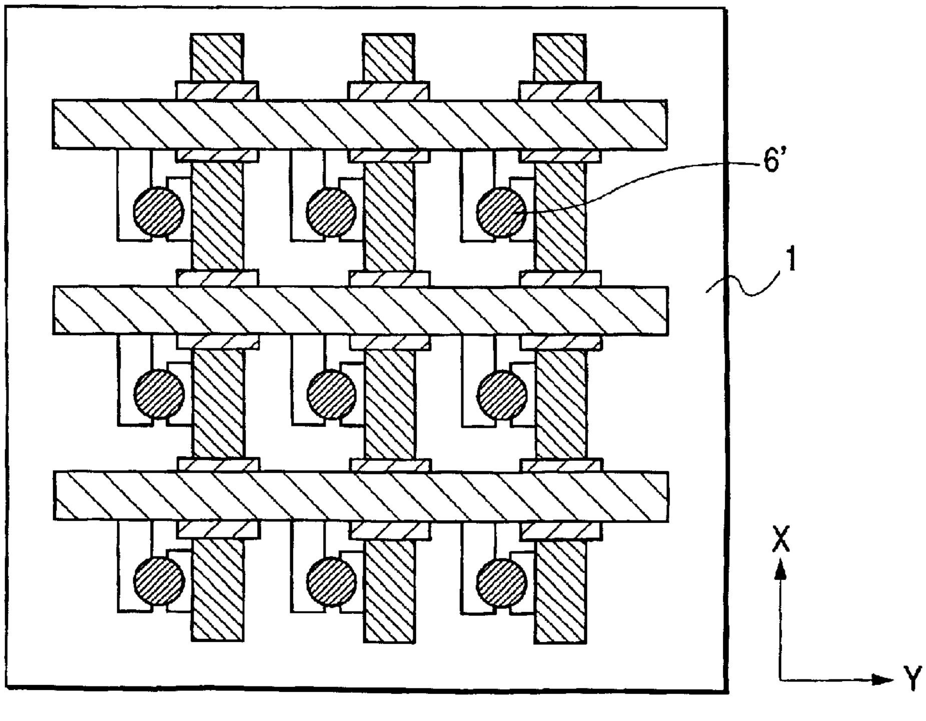
FIG. 11 is a schematic view showing the example of the manufacturing step of the electron source with the simple matrix layout according to the present invention.

(G) "Resistance reduction processing" of reducing the resistance of each polymer film 6" is performed, as described above. In "resistance reduction processing", the polymer film 6" is irradiated with a particle beam or light. "Resistance reduction processing" is preferably done in a reduced-pressure atmosphere. This step increases the conductivity of the polymer film 6" and changes the polymer film 6" into a conductive film 6' (FIG. 11). More specifically, the sheet resistance value of the conductive film 6' falls within the range of $10^3$ Ω/□ or more to $10^7$ Ω/□ or less.

Figure 12:
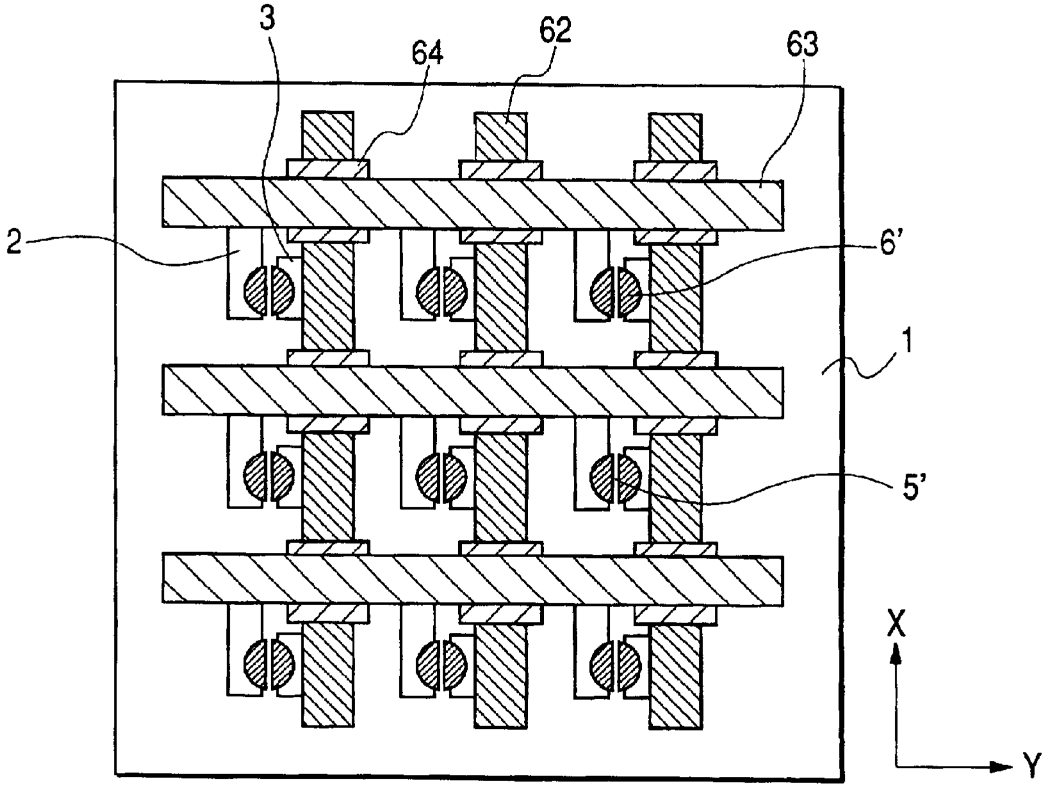
FIG. 12 is a schematic view showing the example of the manufacturing step of the electron source with the simple matrix layout according to the present invention.
Figure 13A:
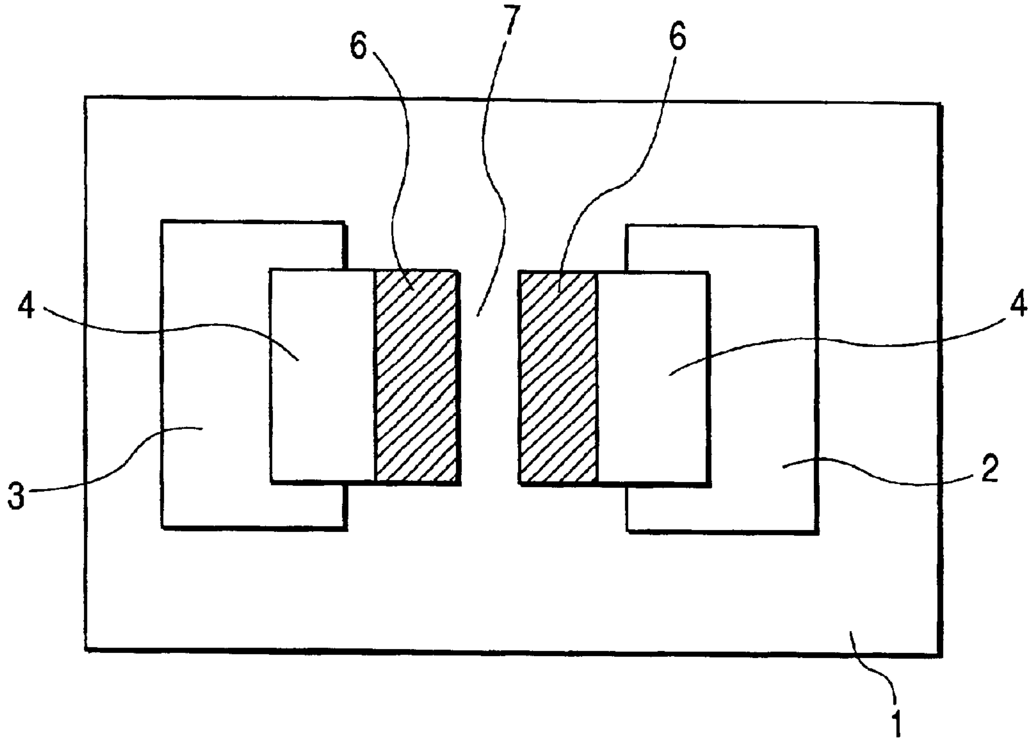
FIG. 13A PRIOR ART
FIGS. 13A and 13B are schematic views showing a conventional electron-emitting device.
Figure 13B:
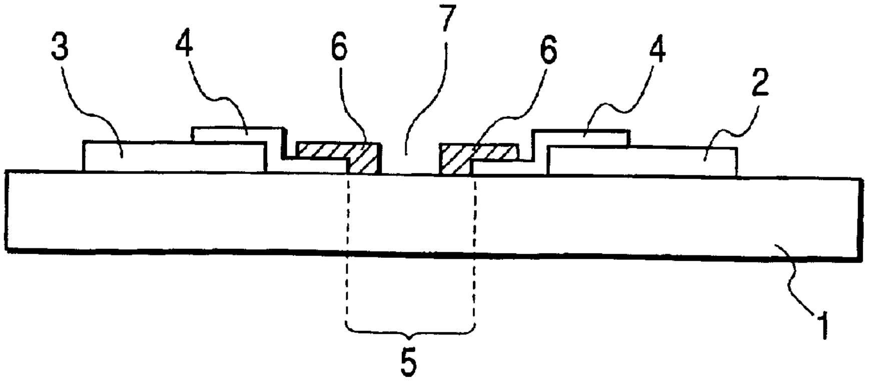
FIG. 13B PRIOR ART
Figure 14A:
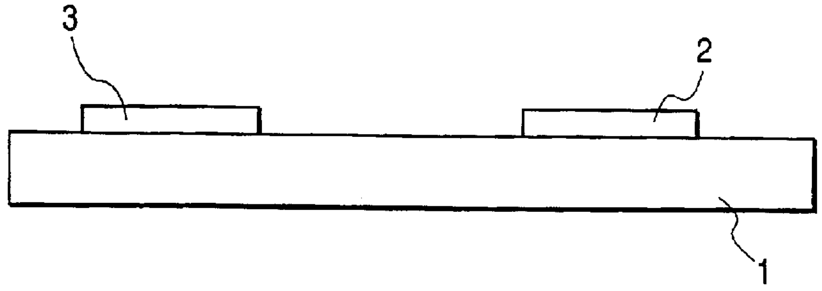
FIG. 14A PRIOR ART
FIGS. 14A, 14B, 14C and 14D are schematic views, respectively, showing the steps in manufacturing the conventional electron-emitting device.
Figure 14B:
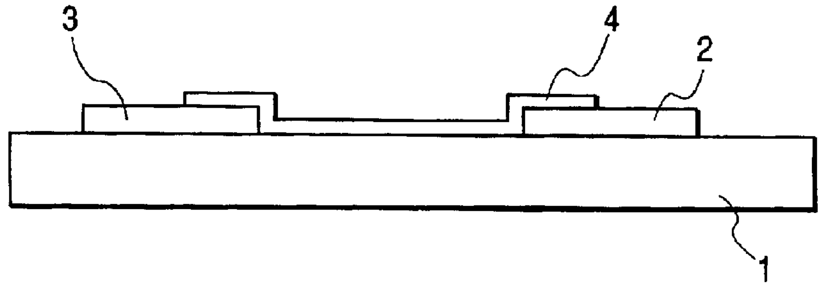
FIG. 14B PRIOR ART
Figure 14C:
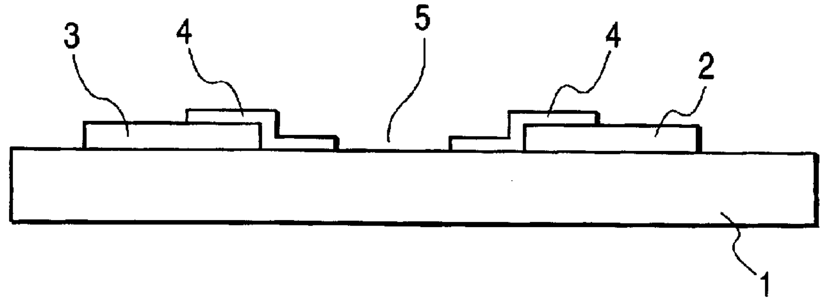
FIG. 14C PRIOR ART
Figure 14D:
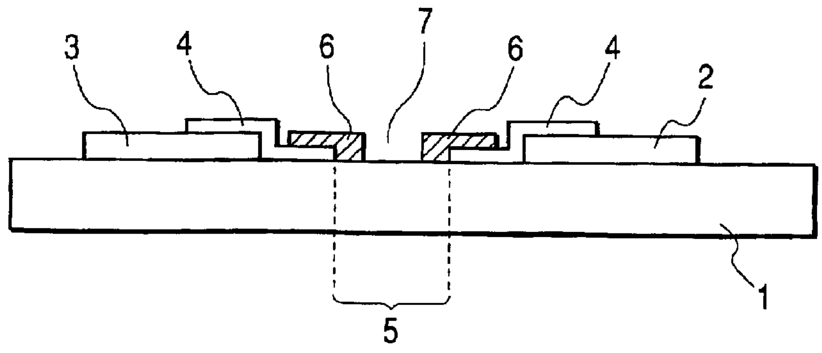
FIG. 14D PRIOR ART

(H) A gap 5' is formed in each conductive film 6' (resistance-reduced polymer film) obtained by step (G). The gap 5' is formed by applying each wiring line 62 and/or wiring line 63. As a result, a voltage is applied between the electrodes 2 and 3. The application voltage is preferably a pulse voltage. The "voltage application step" forms the gap 5' in part of the conductive film 6' (resistance-reduced polymer film) (FIG. 12).

The "voltage application step" can also be executed at the same time as the above-described "resistance reduction processing" by successively applying voltage pulses between the electrodes 2 and 3. In either case, the "voltage application step" is desirably done in a reduced-pressure atmosphere.

Figure 17A:
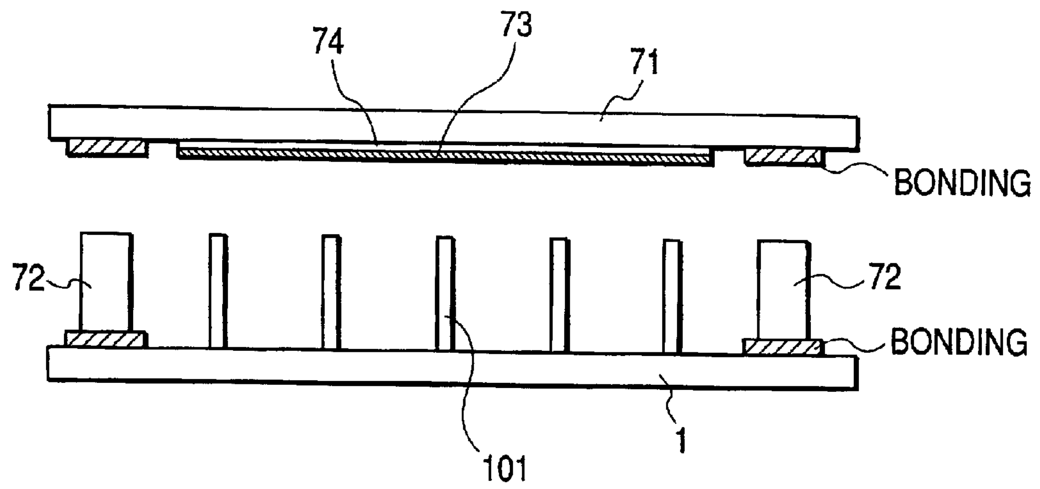
FIGS. 17A and 17B are schematic views showing an example of the manufacturing step of the image-forming apparatus according to the present invention.

(I) A prepared face plate 71 having a metal back 73 made of a conductive film (more specifically, a metal film such as an aluminum film) and a phosphor film 74, and the rear plate 1 formed via steps (A) to (H) are aligned to each other such that the metal back faces the electron-emitting devices (FIG. 17A). Bonding material (sealing material) is applied to the abutment surface (abutment region) between the support frame 72 and the face plate 71. Similarly, bonding material (sealing material) is applied to the abutment surface (abutment region) between the rear plate 1 and the support frame 72. This bonding has a function of retaining vacuum (sealing) and an adhering function. Bonding is made using frit glass, indium, an indium alloy, or the like.

In FIG. 17A, the support frame 72 is fixed (adhered) in advance through bonding onto the rear plate 1 via steps (A) to (H). The support frame 72 may be fixed (adhered) onto the face plate through bonding. In FIG. 17A, spacers 101 are fixed onto the rear plate 1. The spacers 101 may also be fixed (adhered) onto the face plate through bonding.

In FIG. 17A, the rear plate 1 is set below, and the face plate 71 is set above the rear plate 1, for convenience. Either the plate 1 or 71 can be set above.

In FIG. 17A, the support frame 72 and spacers 101 are fixed (adhered) onto the rear plate 1 in advance. Alternatively, they may only be placed on the rear or face plate in this step so as to fix (adhere) them in the next "seal bonding step".

(J) The "seal bonding step" is performed. At least bonding is heated while the face plate 71 and rear plate 1 aligned in step (I) so as to face each other are pressurized in their facing direction. In this case, the entire face and rear plates are preferably heated to reduce thermal distortion. In the present invention, the "seal bonding step" is executed in a reduced-pressure atmosphere (vacuum). An example of the pressure is $10^{-5}$ Pa or less, and preferably $10^{-6}$ Pa or less.

This seal bonding step airtightly seals the abutment portions between the face plate 71, the support frame 72, and the rear plate 1. At the same time, an image-forming apparatus (airtight vessel) 100 shown in FIG. 16 is obtained with its interior kept in high vacuum.

When the image-forming apparatus 100 has a large area, the step of covering the metal back 73 (surface of the metal back facing the rear plate 1) with a getter material is preferably inserted between step (I) and step (J) in order to keep the interior of the image-forming apparatus 100 in high vacuum. At this time, the getter material used is preferably an evaporative getter in order to facilitate covering. Therefore, barium is preferably applied as a getter film onto the metal back 73. The getter covering step is performed in a reduced-pressure atmosphere (vacuum), similar to step (J).

In this example of the image-forming apparatus, the spacers 101 are interposed between the face plate 71 and the rear plate 1. When, however, the image-forming apparatus is small, it does not require the spacers 101. If the interval between the rear plate 1 and the face plate 71 is about several hundred m, the rear plate 1 and face plate 71 can be directly adhered to each other by bonding without using the support frame 72. In this case, bonding serves as an alternative to the support frame 72.

In the present invention, the alignment step (step (I)) and the seal bonding step (step (J)) are performed after the step (step (H)) of forming the gap 5' of the electron-emitting device 102. Step (H) can be executed after the seal bonding step (step (J)).

As described above, the present invention can achieve "resistance reduction processing" by light irradiation. Thus, steps (G) and (H) can be done after step (J). In this case, a transparent substrate such as glass is used as the rear plate 1. More specifically, an airtight vessel (panel) is formed by the "seal bonding" step (J). Then, the above-described "resistance reduction processing" of irradiating the polymer film 6" with light through the rear plate 1 is performed (step (G)). After that, the "voltage application step" (H) is done to form the gap 5' in each conductive film 6'.

EXAMPLES

The present invention will be described in more detail by way of its examples.

Example 1

Example 1 fabricated an image-forming apparatus 100 schematically shown in FIG. 16. An electron-emitting device 102 was an electron-emitting device whose manufacturing method has been described with reference to FIGS. 1A, 1B, and 2A to 2D. The image-forming apparatus fabrication method of Example 1 will be described with reference to FIGS. 6 to 12, 16, 17A, and 17B.

FIG. 12 is a partial enlarged view schematically showing an electron source constituted by a rear plate, a plurality of electron-emitting devices formed on the rear plate, and wiring lines for applying signals to these electron-emitting devices. The electron source comprises a rear plate 1, electrodes 2 and 3, gaps 5', conductive films 6' mainly consisting of carbon, X-direction wiring lines 62, Y-direction wiring lines 63, and interlevel insulating layers 64.

In FIG. 16, the same reference numerals as in FIG. 12 denote the same parts. A phosphor film 74 and Al metal back 73 are stacked on a glass substrate 71. A vacuum vessel is formed by the rear plate 1, the face plate 71, and a support frame 72.

Example 1 will be explained with reference to FIGS. 6 to 12, 16, 17A, and 17B.

Step 1

A Pt film was sputtered on a glass substrate 1 to a thickness of 100 nm. Electrodes 2 and 3 were formed from the Pt film by photolithography (FIG. 6). The distance between the electrodes 2 and 3 was 10 μm.

Step 2

Ag paste was screen-printed, heated, and baked to form X-direction wiring lines 62 (FIG. 7).

Step 3

Insulating paste was screen-printed at positions which were prospective intersections between the X-direction wiring lines 62 and Y-direction wiring lines 63. The insulating paste was baked to form insulating layers 64 (FIG. 8).

Step 4

Ag paste was screen-printed, heated, and baked to form Y-direction wiring lines 63. Accordingly, matrix wiring was formed on the base 1 (FIG. 9).

Step 5

A polyamic acid 3%-N-methylpyrrolidone/triethanolamine solution as a polyimide precursor was applied to the center between the electrodes by an ink-jet method so as to cover a position over each pair of electrodes 2 and 3 on the base 1 having matrix wiring. The solution was baked at 350° C. in vacuum to form polymer films 6" from circular polyimide films about 100 μm in diameter and 300 nm in film thickness (FIG. 10).

Step 6

The rear plate 1 on which the Pt electrodes 2 and 3, the matrix wiring lines 62 and 63, and the polymer films 6" made of the polyimide films were formed was set on a stage (in air). Each polymer film 6" was irradiated with the second harmonic (SHG) of a Nd:YAG laser for a Q switch pulse (pulse width: 100 nm, repetition frequency: 10 kHz, energy per pulse: 0.5 mJ, beam diameter: 10 μm). At this time, the stage was moved to irradiate the polymer film 6"at a width of 10 μm from each electrode 2 toward the corresponding electrode 3. As a result, a conductive region where pyrolysis progressed was formed in part of each polymer film 6".

Step 7

A support frame 72 and spacers 101 were adhered with frit glass onto the rear plate 1 fabricated in the above way. The rear plate 1 to which the spacers and support frame were adhered, and a face plate 71 were so arranged as to face each other (a surface bearing a phosphor film 74 and metal back 73 and a surface bearing the wiring lines 62 and 63 face each other) (FIG. 17A). The face and rear plates were arranged after being satisfactorily aligned. Note that frit glass was applied in advance to an abutment portion on the face plate 71 to the support frame 72.

Step 8

Figure 17B:
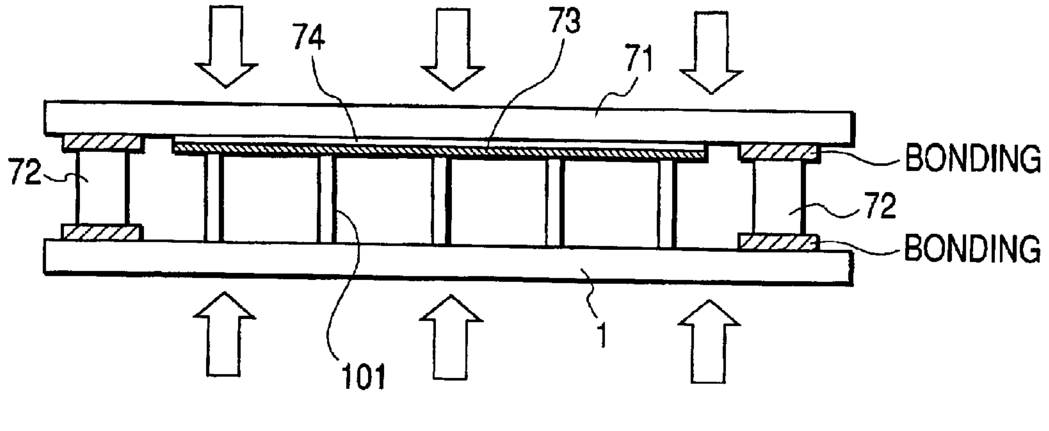

The facing face plate 71 and rear plate 1 were heated to 400° C. in a chamber whose interior was kept in vacuum at $10^{-6}$ Pa. At the same time, the face and rear plates were pressurized in their facing direction and sealed (FIG. 17B). This step fabricated an airtight vessel whose interior was kept in high vacuum. Note that the phosphor film 74 was prepared by forming phosphors of three primary colors (R, G, and B) in stripes.

Finally, bipolar rectangular pulses of 25 V with a pulse width of 1 msec and a pulse interval of 10 msec were applied between the electrodes 2 and 3 through the X-direction wiring lines 62 and Y-direction wiring lines 63, thereby forming gaps 5' in the conductive films 6' (see FIG. 12). Accordingly, the image-forming apparatus 100 of Example 1 was fabricated.

In the image-forming apparatus completed in the above fashion, a desired electron-emitting device was selected through a corresponding X-direction wiring line and Y-direction wiring line. Then, a voltage of 22 V was applied to the selected electron-emitting device. A voltage of 8 kV was applied to the metal back 73 through a high voltage terminal Hv. As a result, a bright, high-quality image could be formed for a long time.

The component of the conductive film 6' of the electron-emitting device formed in Example 1 was examined by Auger electron spectroscopy. The conductive film 6' was found to be a film containing carbon as a main component.

The electron-emitting characteristics of an electron-emitting device formed by the same method as the forming method of Example 1 were measured as follows.

A driving voltage of 22 V was applied between the device electrodes 2 and 3 of the electron-emitting device in Example 1 while 1 kV was applied to an anode electrode 54. The device current If and emission current Ie flowing at this time were measured to find If =0.6 mA and Ie=4.2 $\mu$A. The electron-emitting characteristics could be stably maintained even upon long-time driving.

Example 2

Similar to Example 1, Example 2 fabricated an image-forming apparatus 100 shown in FIG. 16. The steps in Example 2 were the same as those in Example 1 except that step 6 in Example 1 was replaced by the following step 6'.

Resistance reduction processing (step 6') in Example 2 will be described below.

Step 6'

A rear plate 1 on which Pt electrodes 2 and 3, matrix wiring lines 62 and 63, and polymer films 6"made of polyimide films were formed was set in a vacuum vessel in which an electron gun was installed. After the vacuum vessel was fully evacuated, the entire surface of each polymer film 6" was irradiated with an electron beam having the acceleration voltage $V_{ac}$=10 kV and the current density Id=0.1 mA/mm$^2$. At this time, the resistance between the electrodes 2 and 3 was measured. When the resistance decreased to 1 kΩ, irradiation of the electron beam was stopped.

An image-forming apparatus fabricated by the manufacturing method of Example 2 could attain a high-quality image for a long term, similar to Example 1.

The component of a conductive film 6' of an electron-emitting device formed in Example 2 was examined by Auger electron spectroscopy. The conductive film 6' was found to be a film containing carbon as a main component, similar to Example 1.

The characteristic of an electron-emitting device formed by the same method as that of the electron-emitting device in Example 2 was measured similarly to Example 1, and found to be good.

Example 3

Example 3 fabricated an image-forming apparatus by the same steps as those in Example 1 except that steps 7 and 8 in Example 1 were replaced by the following steps 7, 8, and 9.

Step 7

A support frame 72 and spacers 101 were adhered with frit glass onto a fabricated rear plate 1. The rear plate 1 to which the spacers and support frame were adhered, and a face plate 71 were so aligned as to face each other (a surface bearing a phosphor film 74 and metal back 73 and a surface bearing wiring lines 62 and 63 face each other) (FIG. 17A). Note that an indium alloy was applied in advance to an abutment portion on the face plate 71 to the support frame 72.

Step 8

The face plate 71 aligned in step 7 and the rear plate 1 to which the support frame 72 and spacers 101 were fixed were set in vacuum at $10^{-6}$ Pa. At this time, as shown in FIG. 17A, the face plate 71 and support frame 72 were sufficiently spaced apart from each other. Then, getter flash was performed by applying a Ba getter between the face plate 71 and the support frame 72 so as to form the Ba getter film on the metal back 73 of the face plate. By this step, the Ba film covered the entire metal back.

Step 9

While the vacuum atmosphere in step 8 was maintained, the facing face plate 71 and rear plate 1 were heated at 180° C., pressurized, and sealed (FIG. 17B). The resultant structure was gradually cooled for a long time. This step provided an airtight vessel whose interior was kept in high vacuum. Note that the phosphor film 74 was prepared by forming phosphors of three primary colors (R, G, and B) in stripes.

The image-forming apparatus fabricated in Example 3 was driven similar to Example 1, obtaining a more stable image for a longer term in comparison with the image-forming apparatus of Example 1.

The component of a conductive film 6' of an electron-emitting device formed in Example 3 was examined by Auger electron spectroscopy. The conductive film 6' was found to be a film containing carbon as a main component, similar to Example 1.

The characteristic of an electron-emitting device formed by the same method as that of the electron-emitting device in Example 3 was measured similarly to Example 1, and found to be good.

The manufacturing method of the present invention can facilitate the electron-emitting device forming process, and can manufacture a low-cost image-forming apparatus exhibiting high display quality for a long term.

What is claimed is:

1. A method of manufacturing an image-forming apparatus, comprising the steps of:

preparing a first substrate;

forming a plurality of electrode pairs on the first substrate, each electrode pair comprising opposing electrodes;

arranging polymer films, each polymer film bridging between the opposing electrodes in each electrode pair;

irradiating each of the polymer films with light or a particle beam to reduce a resistance of each polymer film and change at least part of each polymer film into a conductive film;

flowing a current between the opposing electrodes in each electrode pair through the conductive film to form a gap in the conductive film; and joining, in a reduced-pressure atmosphere, the first substrate on which each conductive film with the gap is arranged and a second substrate on which an image-forming member is arranged, via a bonding member.

2. A method according to claim 1, wherein the conductive film contains carbon as a primary component.

3. A method according to claim 1, wherein the particle beam includes an electron beam or an ion beam.

4. A method according to claim 3, wherein the electron beam has an acceleration voltage of 0.5 kV to 10 kV.

5. A method according to claim 3, wherein the electron beam has a current density of 0.01 $mA/mm^2$ to 1 $mA/mm^2$.

6. A method according to claim 1, wherein the light includes a laser beam.

7. A method according to claim 1, wherein the light includes xenon light or halogen light.

8. A method according to claim 1, wherein the step of arranging polymer films is performed using an ink-jet method.

9. A method according to claim 1, wherein each polymer film is formed from a material selected from the group consisting of aromatic polyimide, polyphenylene oxadiazole, and polyphenylene vinylene.

10. A method according to any one of claims 1 to 9, further comprising, before the joining step, the step of applying a getter to a surface of the second substrate in a reduced-pressure atmosphere.

* * * * *

UNITED STATES PATENT AND TRADEMARK OFFICE

CERTIFICATE OF CORRECTION

PATENT NO. : 6,781,667 B2
DATED : August 24, 2004
INVENTOR(S) : Takahiro Horiguchi et al.

It is certified that error appears in the above-identified patent and that said Letters Patent is hereby corrected as shown below:

Title page,
Item [56], References Cited, FOREIGN PATENT DOCUMENTS, "3/1997" should read -- 8/1997 --.

Column 4,
Line 3, "films 61" should read -- films 6' --.

Column 7,
Line 50, "1 λm." should read -- 1 $\mu$m. --.

Column 13,
Line 61, "Id=0.1" should read -- $I_d$=0.1 --.

Signed and Sealed this

Sixth Day of September, 2005

JON W. DUDAS
*Director of the United States Patent and Trademark Office*